(12) United States Patent
Chen et al.

(10) Patent No.: US 8,226,241 B2
(45) Date of Patent: Jul. 24, 2012

(54) IMAGE PROJECTOR EMPLOYING A SPECKLE-REDUCING LASER SOURCE

(75) Inventors: Gang Chen, Westfield, NJ (US); Roland Ryf, Aberdeen, NJ (US)

(73) Assignee: Alcatel Lucent, Paris (FR)

( * ) Notice: Subject to any disclaimer, the term of this patent is extended or adjusted under 35 U.S.C. 154(b) by 499 days.

(21) Appl. No.: 12/466,790

(22) Filed: May 15, 2009

(65) Prior Publication Data
US 2010/0290009 A1    Nov. 18, 2010

(51) Int. Cl.
G03B 21/00 (2006.01)
G03B 21/26 (2006.01)
H01S 3/10 (2006.01)
H01S 3/091 (2006.01)
G03H 1/12 (2006.01)
G02F 1/135 (2006.01)

(52) U.S. Cl. ............... 353/31; 353/94; 372/23; 372/92; 372/71; 372/72; 372/38.06; 359/11; 359/27; 349/25; 349/30

(58) Field of Classification Search ............ 353/31, 353/94; 372/23, 92, 70, 71, 72, 69, 38.06; 359/27, 11; 349/25, 30
See application file for complete search history.

(56) References Cited

U.S. PATENT DOCUMENTS

| | | |
|---|---|---|
| 3,546,374 A | 12/1970 | Graser, Jr. |
| 3,549,240 A | 12/1970 | Takeo |
| 3,573,353 A | 4/1971 | Henriques et al. |
| 3,719,127 A | 3/1973 | Mueller |
| 4,281,904 A | 8/1981 | Sprague et al. |
| 4,471,445 A | 9/1984 | Pernick |
| 4,522,466 A | 6/1985 | Lindig et al. |
| 4,834,476 A | 5/1989 | Benton .................. 350/3.76 |
| 4,986,619 A | 1/1991 | Walker et al. ............ 350/3.61 |
| 5,032,002 A | 7/1991 | Fonneland et al. |
| 5,166,742 A | 11/1992 | Kobayashi et al. |
| 5,172,251 A | 12/1992 | Benton et al. ................. 359/9 |

(Continued)

FOREIGN PATENT DOCUMENTS

EP    1 283 434 A2    2/2003

(Continued)

OTHER PUBLICATIONS

International Search Report and Written Opinion for PCT/US2010/034631 (Application Filing Date: May 13, 2010) Mailing Date: Jan. 28, 2011 and Received on Feb. 10, 2011.

(Continued)

*Primary Examiner* — Georgia Y Epps
*Assistant Examiner* — Magda Cruz
(74) *Attorney, Agent, or Firm* — Mendelsohn, Drucker, and Associates, P.C.; Yuri Gruzdkov; Steve Mendelsohn (57) ABSTRACT

An image projector having one or more broadband lasers designed to reduce the appearance of speckle in the projected image via wavelength diversification. In one embodiment, a broadband laser has an active optical element and a nonlinear optical element, both located inside a laser cavity. The broadband laser generates an output spectrum characterized by a spectral spread of about 10 nm and having a plurality of spectral lines corresponding to different spatial modes of the cavity. Different individual spectral lines effectively produce independent speckle configurations, which become intensity-superimposed in the projected image, thereby causing a corresponding speckle-contrast reduction.

24 Claims, 3 Drawing Sheets

U.S. PATENT DOCUMENTS

| | | | |
|---|---|---|---|
| 5,192,946 A | 3/1993 | Thompson et al. | |
| 5,239,322 A | 8/1993 | Takanashi et al. | 353/31 |
| 5,272,473 A | 12/1993 | Thompson et al. | |
| 5,412,674 A * | 5/1995 | Scheps | 372/22 |
| 5,440,352 A | 8/1995 | Deter et al. | |
| 5,506,597 A | 4/1996 | Thompson et al. | 345/85 |
| 5,596,451 A | 1/1997 | Handschy et al. | 359/633 |
| 5,617,227 A | 4/1997 | De Bougrenet De La Tocnaye et al. | 349/57 |
| 5,798,819 A | 8/1998 | Hattori et al. | 353/33 |
| 5,834,331 A | 11/1998 | Razeghi | 438/40 |
| 6,211,848 B1 | 4/2001 | Plesniak et al. | 345/1 |
| 6,250,778 B1 | 6/2001 | Doumuki | |
| 6,304,237 B1 | 10/2001 | Karakawa | |
| 6,317,169 B1 | 11/2001 | Smith | |
| 6,323,984 B1 | 11/2001 | Trisnadi | 359/245 |
| 6,426,836 B2 | 7/2002 | Dorsel et al. | 359/443 |
| 6,577,429 B1 | 6/2003 | Kurtz et al. | 359/279 |
| 6,594,090 B2 | 7/2003 | Kruschwitz et al. | 359/787 |
| 6,600,590 B2 | 7/2003 | Roddy et al. | 359/287 |
| 6,621,235 B2 | 9/2003 | Chang | |
| 6,625,381 B2 | 9/2003 | Roddy et al. | 385/147 |
| 6,771,326 B2 | 8/2004 | Flint et al. | |
| 6,791,739 B2 | 9/2004 | Ramanujan et al. | 359/279 |
| 6,797,983 B2 | 9/2004 | Chen et al. | 257/59 |
| 6,870,650 B2 | 3/2005 | Kappel et al. | |
| 6,876,484 B2 | 4/2005 | Greywall | 359/291 |
| 6,902,276 B2 | 6/2005 | Glenn | 353/98 |
| 6,906,839 B2 | 6/2005 | Gerchberg | |
| 6,940,577 B2 | 9/2005 | Kozhukh | 349/156 |
| 6,947,459 B2 * | 9/2005 | Kurtz et al. | 372/43.01 |
| 6,950,454 B2 * | 9/2005 | Kruschwitz et al. | 372/92 |
| 6,984,917 B2 | 1/2006 | Greywall et al. | 310/310 |
| 7,099,063 B2 | 8/2006 | Greywall | 359/290 |
| 7,138,648 B2 | 11/2006 | Kneissl et al. | 257/14 |
| 7,156,522 B2 | 1/2007 | Plut | |
| 7,161,608 B2 | 1/2007 | Pettitt et al. | |
| 7,244,028 B2 | 7/2007 | Govorkov et al. | |
| 7,268,852 B2 | 9/2007 | Kuan et al. | 349/165 |
| 7,289,209 B2 | 10/2007 | Kowarz et al. | |
| 7,298,532 B2 | 11/2007 | Thomas et al. | |
| 7,307,786 B2 | 12/2007 | Hatjasalo et al. | 359/569 |
| 7,342,658 B2 | 3/2008 | Kowarz et al. | |
| 7,355,657 B2 | 4/2008 | Chilla et al. | |
| 7,413,311 B2 | 8/2008 | Govorkov et al. | |
| 7,423,808 B2 | 9/2008 | Lee | |
| 7,481,541 B2 | 1/2009 | Maximus et al. | |
| 7,492,948 B2 | 2/2009 | Gluckstad | |
| 7,502,160 B2 | 3/2009 | Aksyuk et al. | 359/290 |
| 7,595,622 B1 | 9/2009 | Tomiyoshi et al. | |
| 7,646,518 B2 | 1/2010 | Kasazumi | |
| 7,782,521 B2 | 8/2010 | Khan et al. | |
| 7,843,150 B2 | 11/2010 | Wang et al. | |
| 2001/0019434 A1 | 9/2001 | Popovich et al. | |
| 2001/0022613 A1 | 9/2001 | Matsui et al. | |
| 2002/0034710 A1 | 3/2002 | Morris et al. | 430/321 |
| 2003/0039036 A1 | 2/2003 | Kruschwitz et al. | |
| 2003/0165013 A1 | 9/2003 | Doany et al. | 359/485 |
| 2003/0218794 A1 | 11/2003 | Takeda et al. | |
| 2004/0008392 A1 | 1/2004 | Kappel et al. | |
| 2004/0213515 A1 | 10/2004 | Pezeshki et al. | |
| 2004/0239880 A1 | 12/2004 | Kapellner et al. | 353/20 |
| 2004/0263802 A1 | 12/2004 | Seki et al. | |
| 2005/0013005 A1 | 1/2005 | Rogers | |
| 2005/0147135 A1 * | 7/2005 | Kurtz et al. | 372/23 |
| 2005/0219675 A1 | 10/2005 | Aksyuk et al. | 359/224 |
| 2005/0243282 A1 | 11/2005 | Peterson et al. | |
| 2005/0253055 A1 | 11/2005 | Sprague et al. | |
| 2006/0018025 A1 | 1/2006 | Sharon et al. | |
| 2006/0028961 A1 | 2/2006 | Kim et al. | 369/112.01 |
| 2006/0066964 A1 | 3/2006 | Greywall | 359/849 |
| 2006/0109386 A1 | 5/2006 | Serafimovich et al. | |
| 2006/0109553 A1 | 5/2006 | Serafimovich et al. | |
| 2006/0126022 A1 | 6/2006 | Govorkov et al. | |
| 2006/0126151 A1 | 6/2006 | Aksyuk et al. | 359/291 |
| 2006/0175622 A1 | 8/2006 | Richards et al. | |
| 2006/0181770 A1 | 8/2006 | Lee | |
| 2006/0227440 A1 | 10/2006 | Gluckstad | |
| 2006/0267449 A1 | 11/2006 | Aksyuk et al. | 310/309 |
| 2007/0024213 A1 | 2/2007 | Shteynberg et al. | |
| 2007/0046907 A1 | 3/2007 | Shin | 353/119 |
| 2007/0070296 A1 | 3/2007 | Iwanaga | |
| 2007/0070302 A1 | 3/2007 | Govorkov et al. | |
| 2007/0153378 A1 | 7/2007 | Lee | |
| 2007/0153866 A1 * | 7/2007 | Shchegrov et al. | 372/50.124 |
| 2007/0216982 A1 | 9/2007 | Sanders et al. | |
| 2007/0251916 A1 | 11/2007 | Akahane et al. | |
| 2007/0257623 A1 | 11/2007 | Johnson et al. | |
| 2007/0262724 A1 | 11/2007 | Mednik et al. | |
| 2007/0279731 A1 | 12/2007 | Blumberg | 359/291 |
| 2008/0116818 A1 | 5/2008 | Shteynberg et al. | |
| 2008/0158513 A1 | 7/2008 | Bartlett et al. | |
| 2008/0212034 A1 | 9/2008 | Aksyuk et al. | |
| 2008/0212040 A1 | 9/2008 | Aksyuk | 353/99 |
| 2008/0212159 A1 | 9/2008 | Giles et al. | 359/238 |
| 2008/0219303 A1 | 9/2008 | Chen et al. | 372/23 |
| 2008/0297128 A1 | 12/2008 | Xu et al. | |
| 2009/0009719 A1 | 1/2009 | Ryf | 353/20 |
| 2009/0096999 A1 | 4/2009 | Frahm et al. | |
| 2009/0153579 A1 | 6/2009 | Ichikawa et al. | |
| 2009/0158140 A1 | 6/2009 | Bauchot et al. | |
| 2009/0184579 A1 | 7/2009 | Owens, Jr. et al. | 307/10.7 |
| 2009/0184659 A1 | 7/2009 | Chen et al. | 315/294 |
| 2009/0184976 A1 | 7/2009 | Chen et al. | |
| 2009/0185140 A1 | 7/2009 | Chen et al. | 353/31 |
| 2009/0185141 A1 | 7/2009 | Chen et al. | 353/38 |
| 2009/0191489 A1 | 7/2009 | Sandstrom | |
| 2009/0310087 A1 | 12/2009 | Itoh et al. | |

FOREIGN PATENT DOCUMENTS

| | | |
|---|---|---|
| EP | 1 292 134 A2 | 3/2003 |
| EP | 1 703 318 A1 | 9/2006 |
| EP | 1 734 771 A1 | 12/2006 |
| EP | 1 750 441 A2 | 2/2007 |
| WO | WO 2004/064410 A1 | 7/2004 |
| WO | WO 2006/104704 A1 | 10/2006 |
| WO | WO 2007/024503 A1 | 3/2007 |
| WO | WO2007072335 A2 | 6/2007 |
| WO | WO 2008/108947 A1 | 9/2008 |

OTHER PUBLICATIONS

Moulton et al., "High-Powered RGB Laser Source for Displays," presented at the IMAGE 2002 Conference, Scottsdale, AZ Dec. 7-8, 2002, 4 pages. (Jul. 2002 ).

"Presentation Industry's First Texas Instruments Digital Light Processing Technology Projector with DCDi for Color Critical and Home Theater Applications," Dec. 18, 2001, downloaded from http://www.hcinema.de/pdf/presse/mitsubishixd200-press-en.pdf 2 pp.

Fienup, J.R., "Reconstruction of an object from the modulus of its Fourier transform," Optics Letters, vol. 3, No. 1, pp. 27-29, Jul. 1978.

Fienup, J.R. "Phase retrieval algorithms: a comparison." Applied Optics, vol. 21, No. 15, pp. 2758-2769, Aug. 1, 1982.

Zalevsky, Z. et al., "Gerchberg-Saxton algorithm applied in the fractional Fourier or the Fresnel domain," Optics Letters, vol. 21, No. 12, pp. 842-844, Jun. 15, 1996.

Watson, G.P. et al., "Comparison of tilting and piston mirror elements for 65 nm mode spatial light modulator optical maskless lithography," J. Vac. Technol., vol. B 22, No. 6, pp. 3038-3042, Nov./Dec. 2004.

K. Greene, "Ultra-Colorful TV" published online at: http://www.technologyreview.com/read_article.aspx?id=17651&ch=infotech&sc=&pg=2, Technology Review, Oct. 24, 2006, pp. 1-4.

Lucente, Mark, "Diffraction-Specific Fringe Computation for Electro-Holography," Ph.D Thesis, Dept. of Electrical Engineering and Computer Science, Massachusetts,Institute of Technology, available online at http://www.lucente.biz/pubs/PhDthesis/contents.html, Sep. 1994, abstract, table of contents, and pp. 13-174.

R. W. Gerchberg, "Super-resolution through error energy reduction", Optica Acta, 1974, vol. 21, No. 9, pp. 709-720.

"Novalux Delivers High-Power, Blue, Solid-State Light Sources to Consumer Electronics Partners", published on line at: http://novalux.com/company/press.php?release=5, Nov. 7, 2005, 2 pages.

"Single and Dual Panel LC Projection Systems," by M. G. Robinson, J. Chen, G. D. Sharp, Wiley, Chichester (England), 2005, Chapter 11, pp. 257-275.

"DC-DC Converter Basics" published on line at: http://www.powerdesigners.com/InfoWeb/design_center/articles/DC-DC/converter.shtm, 12 pages, (Jan. 9, 2008).

"PVPro Enabling person video projects", Light Blue Optics Ltd., available online at: www.lightblueoptics.com, (2006) 5 pages.

R.W. Gerchberg and W.O. Saxton, "Phase Determination from Image and Diffraction Plane Pictures in the Electron Microscope", OPTIK, vol. 34, No. 3 (1971), pp. 275-284.

R.W. Gerchberg and W.O. Saxton, "A Practical Algorithm for the Determination of Phase from Image and Diffraction Plane Pictures" OPTIK, vol. 35, No. 2 (1972), pp. 237-246.

"A Tail of Two Cats", published on line at: http://www.ysbl.york.ac.uk/~cowtan/fourier/coeff.html, Dec. 15, 2006, 3 pages.

K. Greene, "Pocket Projectors" published on line at: http://www.technologyreview.com/BizTech/17860/, Technology Review, Dec. 6, 2006, 3 pages.

"Study of a New Ytterbium Doped Phosphate Laser Glass," by DAI Shixun et al., Chinese Science Bulletin, vol. 47, No. 3, Feb. 2002, pp. 255-259.

"A Tunable, Short, (5cm) Glass Fiber Laser for Helium Optical Pumping," by L.D. Schearer et al, Journal De Physique IV. Article published online by EDP Sciences and available at http://dx.doi.org/10.1051/jp4:1991787, 4 pages. Dec. 1991.

"Spectrum Stability of a Broadband 1060nm Nd-Doped Fibre Laser," Electronics Letters, vol. 26, No. 13, Jun. 21, 1990, 3 pages.

"Efficient Second Harmonic Generation of Femtosecond Laser at 1μm," by Heyuan Zhu et al., May 17, 2004, vol. 12, No. 10, Optics Express 2150, 6 pages.

"Perceived Speckle Reduction in Projection Display Systems" by Kerigan, SC et al., IP.com Journal, IP.com Inc., IP.com No. IPCOM000118774D; West Henrietta, NY, Jul. 1, 1997, XP-013106711.

"Some Fundamental Properties of Speckle" by J. W. Goodman, Journal of the Optical Society of America, American Institute of Physics, New York, vol. 66, No. 11, Nov. 1, 1976, pp. 1145-1150, XP-002181682.

* cited by examiner

IMAGE PROJECTOR EMPLOYING A SPECKLE-REDUCING LASER SOURCE

BACKGROUND

1. Field of the Invention

The present invention relates to image projectors and, more specifically but not exclusively, to image projectors employing speckle-reducing laser sources.

2. Description of the Related Art

This section introduces aspects that may help facilitate a better understanding of the invention(s). Accordingly, the statements of this section are to be read in this light and are not to be understood as admissions about what is in the prior art or what is not in the prior art.

A projector is a device that integrates a light source, optics, electronics, and a light-modulating element for the purpose of projecting an image or a sequence of images, e.g., from a computer or video input, onto a wall or screen for large-image viewing. There are many projectors available in the market, and they are differentiated by their size, resolution, performance, and other features. Some projectors employ laser light sources because the use of lasers enables creation of vibrant images with extensive color coverage that might be difficult to achieve with other (non-laser) light sources. However, one significant obstacle to laser image projection is the speckle phenomenon that tends to superimpose a granular structure on the perceived image. Since speckle both degrades the image sharpness and annoys the viewer, speckle reduction is highly desirable.

SUMMARY

Disclosed herein are various embodiments of an image projector having one or more broadband lasers designed to reduce the appearance of speckle in the projected image via wavelength diversification. In one embodiment, a broadband laser has an active optical element and a nonlinear optical element, both located inside a laser cavity. The broadband laser generates an output spectrum characterized by a spectral spread of about 10 nm and having a plurality of spectral lines corresponding to different spatial modes of the cavity. Different individual spectral lines effectively produce independent speckle configurations, which become intensity-superimposed in the projected image, thereby causing a corresponding speckle-contrast reduction.

According to one embodiment, provided is an optical device for projecting an image. The optical device has (i) a first laser comprising a laser cavity and adapted to generate a first light beam; and (ii) a spatial light modulator (SLM) configured to be illuminated using the first light beam. The SLM is adapted to modulate received illuminating light using a spatial pattern generated by a plurality of pixels to form the image. The first light beam has a spectrum comprising a plurality of spectral lines corresponding to a plurality of different spatial modes of said laser cavity. The optical device projects the image using light having said spectrum.

According to another embodiment, provided is a method of projecting an image. The method has the steps of: generating with a first laser a first light beam; directing the first light beam to illuminate an SLM; and modulating illuminating light received by the SLM with a spatial pattern generated by a plurality of pixels to form the image. The first laser comprises a laser cavity. The first light beam has a spectrum comprising a plurality of spectral lines corresponding to a plurality of different spatial modes of said laser cavity. The method further has the step of projecting the image using light having said spectrum.

According to yet another embodiment, provided is an optical device for projecting an image. The optical device has a first laser adapted to generate a first light beam having a spectrum characterized by a spectral spread greater than about 2 nm, but smaller than about 20 nm. The optical device further has an SLM configured to be illuminated using the first light beam, wherein the SLM is adapted to modulate received illuminating light using a spatial pattern generated by a plurality of pixels to form the image. The optical device projects the image using light having said spectrum.

According to yet another embodiment, provided is a laser having a laser cavity and an optical pump adapted to optically pump the laser cavity. The laser is adapted to generate a light beam characterized by a broadband spectrum. The spectrum comprises a plurality of spectral lines corresponding to a plurality of different spatial modes of said laser cavity.

BRIEF DESCRIPTION OF THE DRAWINGS

Other aspects, features, and benefits of various embodiments of the invention will become more fully apparent, by way of example, from the following detailed description and the accompanying drawings, in which.

DETAILED DESCRIPTION

In laser image projectors, speckle reduction is generally based on averaging two or more independent speckle configurations within the spatial and/or temporal resolution of the detector, such as the human eye. For the human eye, the averaging time can be deduced from a physiological parameter called the flicker fusion threshold or flicker fusion rate. More specifically, light that is pulsating at a rate lower than the flicker fusion rate is perceived by humans as flickering. In contrast, light that is pulsating at a rate higher than the flicker fusion rate is perceived as being constant in time. Flicker fusion rates vary from person to person and also depend on the individual's level of fatigue, the brightness of the light source, and the area of the retina that is being used to observe the light source. Nevertheless, very few people perceive flicker at a rate higher than about 75 Hz. Indeed, in cinema and television, frame delivery rates are between 20 and 60 Hz, and 30 Hz is normally used. For the overwhelming majority of people, these rates are higher than their flicker fusion rate.

Independent speckle configurations may be produced using diversification of phase, angle, polarization, and/or wavelength of the illuminating laser beam. One approach to achieving phase and angle diversity is the use of a time-varying (e.g., vibrating) diffuser. Polarization diversity can be achieved, e.g., by using a projection screen that exhibits good depolarizing characteristics. Wavelength diversity reduces speckle because speckle is an interference phenomenon that depends on the wavelength of the illuminating light. Since phase, angle, polarization, and wavelength diversities are independent characteristics of the illuminating laser beam, different diversification techniques may be combined and used simultaneously and/or complementarily.

Wavelength diversification according to various embodiments of the invention is explained below in reference to an exemplary image projector. Descriptions of several additional image projectors, in which various embodiments of the invention can also be practiced, can be found, e.g., in commonly owned U.S. Pat. No. 7,502,160 and U.S. patent application Ser. No. 12/017,440, each of which is incorporated herein by reference in its entirety. One of ordinary skill in the art will readily understand how to use wavelength-diversification techniques and/or devices described below in those image projectors, as well as in other image projectors, already known or developed in the future.

Figure 1:
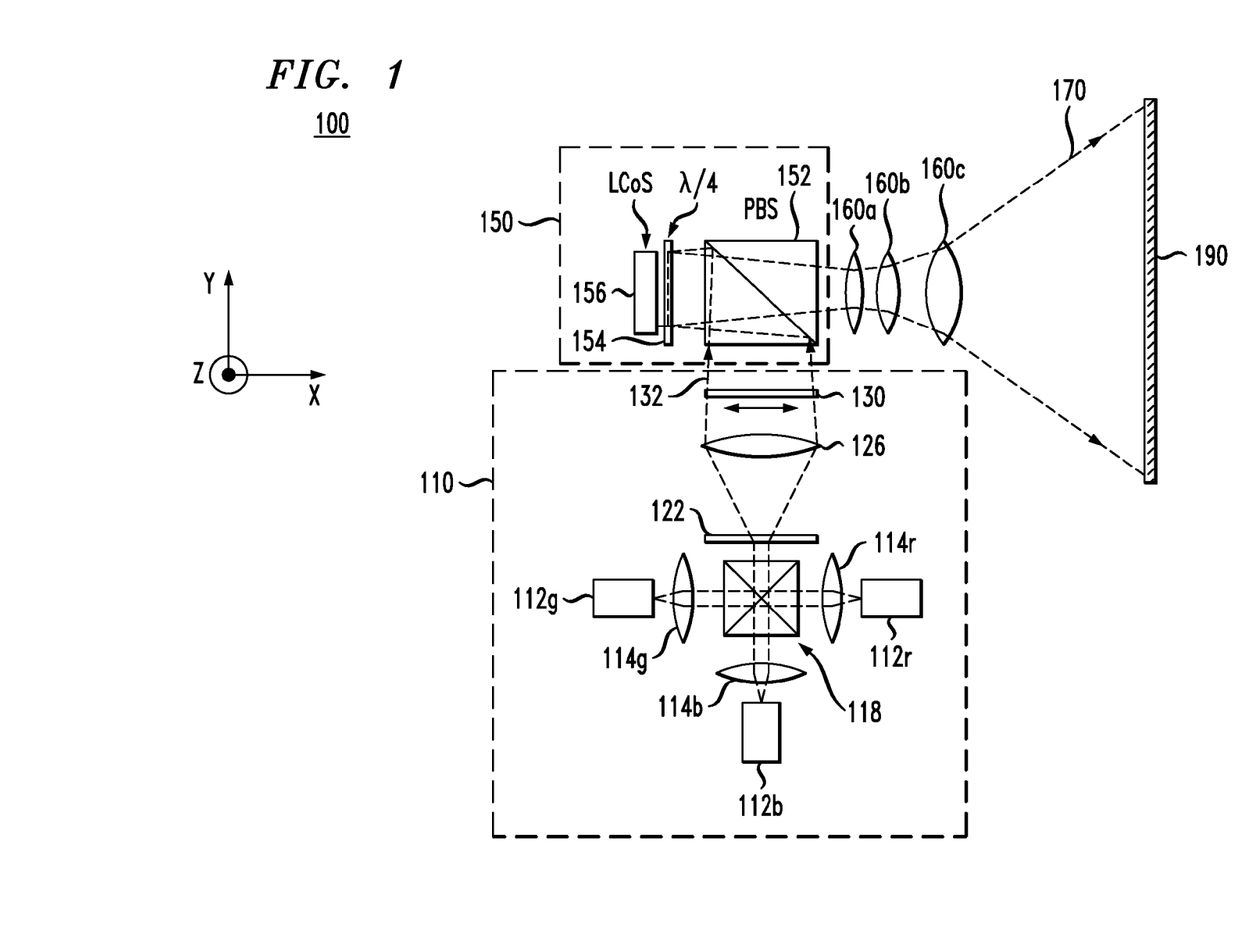
FIG. 1 shows a block diagram of a projector according to one embodiment of the invention.

FIG. 1 shows a block diagram of a projector 100 according to one embodiment of the invention. Projector 100 has a light source 110 adapted to feed multi-colored light (e.g., red, green, and blue) into a modulator section 150. Modulator section 150 generates a spatially intensity-modulated beam 170 that, after passing through a projection lens 160, forms a multi-colored image on a screen 190. Although, in FIG. 1, projection lens 160 is illustratively shown as a compound lens having three lenses 160a-c, other types of projection lenses can similarly be used.

Light source 110 has a set of three lasers 112r, 112g, and 112b, each adapted to generate pulsed light of a designated color, e.g., red, green, and blue, respectively. In one embodiment, each of lasers 112r, 112g, and 112b generates light having a relatively large spectral spread. As used herein, the term "spectral spread" should be construed as referring to one or both of: (i) the spectral width of an output emission band generated by the laser as measured at the base of said emission band and (ii) a full width at half maximum (FWHM) of said emission band.

In various embodiments, the spectral spread is greater than about 1 nm, or greater than about 2 nm, or greater than about 5 nm, or greater than about 7 nm, or even greater than about 10 nm. At the same time, a desired spectral spread for each of lasers 112r, 112g, and 112b generally has an upper bound corresponding to a threshold value, above which the output beam generated by the laser is perceived as having a desaturated or impure color, as opposed to being perceived as having a saturated and substantially pure color. For example, the spectral spread for laser 112r is selected so that the output light generated by the laser is perceived by the human eye as being generally red in color. Similarly, the spectral spread for laser 112g is selected so that the output light generated by the laser is perceived by the human eye as being generally green in color, and the spectral spread for laser 112b is selected so that the output light generated by the laser is perceived by the human eye as being generally blue in color. A representative upper bound on the spectral spread is about 20 nm and, for some colors, might be about 15 nm. These spectral characteristics of lasers 112r, 112g, and 112b help to reduce the appearance of speckle in the image projected by projector 100 due to the above-mentioned wavelength diversification. Several embodiments of a laser that can be used to implement each of lasers 112r, 112g, and 112b are described in more detail below in reference to FIGS. 2 and 3A-B.

Each of the optical beams generated by lasers 112r, 112g, and 112b is a diverging beam that is collimated by a corresponding lens 114 placed in front of the laser. The resulting collimated optical beams lie substantially in a plane parallel to the XY plane, as indicated in FIG. 1. Lasers 112r, 112g, and 112b are synchronized so that modulator section 150 receives a periodic train of pulses of light. For example, each illumination period may have three or more sequential pulses of different colors, wherein the pulses appear at a selected repetition rate (e.g., about 60 Hz).

A color combiner (also often referred to as an X-cube) 118 (re)directs the collimated optical beams received from lenses 114r, 114g, and 114b toward an optical arrangement composed of a first optical diffuser 122, a collimation/condenser lens 126, and a second optical diffuser 130 whose respective optical functions are described in more detail below. In FIG. 1, light source 110 is shown as having optical diffuser 130 located downstream from lens 126. In an alternative embodiment, optical diffuser 130 can be placed upstream from lens 126. Light source 110 may further incorporate a polarizer or other birefringent element (not explicitly shown) that serves to adjust, if necessary, the polarization of output beam 132 to enable proper operation of modulator section 150.

Modulator section 150 has a liquid-crystal-on-silicon (LCOS) spatial light modulator (SLM) 156 optically coupled to a polarization beam splitter (PBS) 152 and a quarter-wave ($\lambda/4$) plate 154. A representative LCOS SLM that can be used as SLM 156 is described, e.g., in "Polarization Engineering for LCD Projection," by M. G. Robinson, J. Chen, G. D. Sharp, Wiley, Chichester (England), 2005, Chapter 11, pages 257-275, the teachings of which are incorporated herein by reference in their entirety. LCOS SLMs that can be adapted for use as SLM 156 are also disclosed, e.g., in U.S. Pat. Nos. 7,268,852, 6,940,577, and 6,797,983, all of which are incorporated herein by reference in their entirety. A suitable LCOS SLM that can be used as SLM 156 is manufactured by JVC Corporation and is commercially available as part of JVC Projector Model DLA-HD2K.

PBS 152 is oriented with respect to the polarization of beam 132 so as to redirect substantially all light of that beam towards SLM 156. Quarter-wave plate 154 is a birefringent plate that produces a retardation of about one quarter of a wavelength between two orthogonal linear polarization components of an optical beam normally passing therethrough. Normally traversing quarter-wave plate 154 two times causes the light directed to SLM 156 and then reflected from the SLM (from the pixels that are in the ON state) to acquire the polarization needed to be transmitted by PBS 152. That is, the polarization of such reflected light is such that PBS 152 transmits such light without substantially reflecting the light back toward light source 110. After being transmitted through PBS 152, the spatially modulated light reflected from SLM 156 and shaped by lens 160 forms output beam 170.

Each reflection pattern displayed by the ON-state pixels of SLM 156 represents an image to be projected onto screen 190, and the SLM can display a new reflection pattern for each burst of light. In effect, projection lens 160 images the reflection pattern displayed by SLM 156 onto screen 190. If the burst repetition rate is sufficiently high (e.g., greater than the flicker fusion rate), then the images corresponding to the three different colors are fused by the human eye, thereby creating a perceived multi-colored image.

Optical diffuser 122 is adapted to act as a beam shaper. Laser 112 typically emits a cone of light having a generally circular or oval cross section, whereas SLM 156 typically has a generally rectangular active area (i.e., the area that contains reconfigurable pixels) suitable for displaying rectangular images. Accordingly, optical diffuser 122 transforms a beam having a generally circular or oval cross section into a beam having a generally rectangular cross section of a shape corresponding to that of the active area of SLM 156. U.S. Pat. No. 7,307,786, which is incorporated herein by reference in its entirety, discloses how to make and use an optical diffuser that can serve as optical diffuser 122. In various embodiments, various optical diffusers selected from those commercially available from RPC Photonics, Inc., of Rochester, N.Y., USA, can be used as optical diffuser 122.

While performing the beam shaping, optical diffuser 122 alters the angular divergence of the optical beam transmitted therethrough. More specifically, optical diffuser 122 converts the substantially collimated beam received from color combiner 118 into a diverging beam, e.g., as indicated by the corresponding dotted lines in FIG. 1. Lens 126 is configured to substantially re-collimate that diverging beam and direct the resulting collimated beam toward optical diffuser 130.

Optical diffuser 130 is adapted to perform at least two optical functions: (1) to act as a spatial intensity homogenizer and (2) to impose a specified angular distribution onto the collimated beam received from lens 126. Referring to the first function of optical diffuser 130, the light applied to optical diffuser 130 typically has various intensity non-uniformities mostly because the beam of light emitted by laser 112 has a non-uniform intensity distribution, such as bright spots and/or variously shaped stripes, with more light being concentrated near the center axis of the beam than near its periphery. However, projected images of high quality are typically obtained if SLM 156 is placed under generally uniform illumination or substantially uniform intensity distribution over its active area. Accordingly, optical diffuser 130 transforms the non-uniform light-intensity distribution into a substantially uniform one.

Referring to the second function of optical diffuser 130, in one embodiment, that optical diffuser comprises an optically transparent plate having a relatively complex micro-structured surface. If a collimated beam impinges onto optical diffuser 130, then different portions of the surface change the propagation direction of the corresponding portions of the collimated beam by respective different amounts, thereby creating a corresponding angular distribution in the beam produced by the optical diffuser. This angular distribution defines a range of angles at which each pixel of SLM 156 receives light from light source 110 and produces incident-angle diversity at the SLM. In various embodiments, optical diffuser 130 can be designed to produce an angular distribution width that ranges from about 2 degrees to about 10 degrees. U.S. Patent Application Publication No. 20020034710, which is incorporated herein by reference in its entirety, discloses how to make and use an optical diffuser that can serve as optical diffuser 130. In various embodiments, various optical diffusers selected from those commercially available from RPC Photonics, Inc., of Rochester, N.Y., USA, can be used as optical diffuser 130.

When optical elements in projector 100 are temporally stationary (not moving with respect to one another), a pixel of SLM 156 receives illumination characterized by a certain phase relationship between the light rays having different incident angles. However, this phase relationship changes as a function of the pixel's position with respect to optical diffuser 130. Projector 100 is designed to exploit this relative phase variation to produce speckle reduction in the projected image.

In one embodiment, optical diffuser 130 is adapted to move, e.g., oscillate along the X axis as indicated by the double-headed arrow in FIG. 1. At a given pixel of SLM 156, this motion of optical diffuser 130 imposes an oscillatory temporal modulation on the relative phases of the light rays having different incident angles without substantially changing the range of angles at which the light is being received at the pixel. If the frequency of this oscillatory modulation is sufficiently high, e.g., higher than the flicker fusion rate, then the appearance of speckle in the projected image can be further reduced because the modulation is able to reduce (or preferably destroy) the spatial coherence of light received at the pixel and suppress the interference effects that give rise to speckle.

Figure 2:
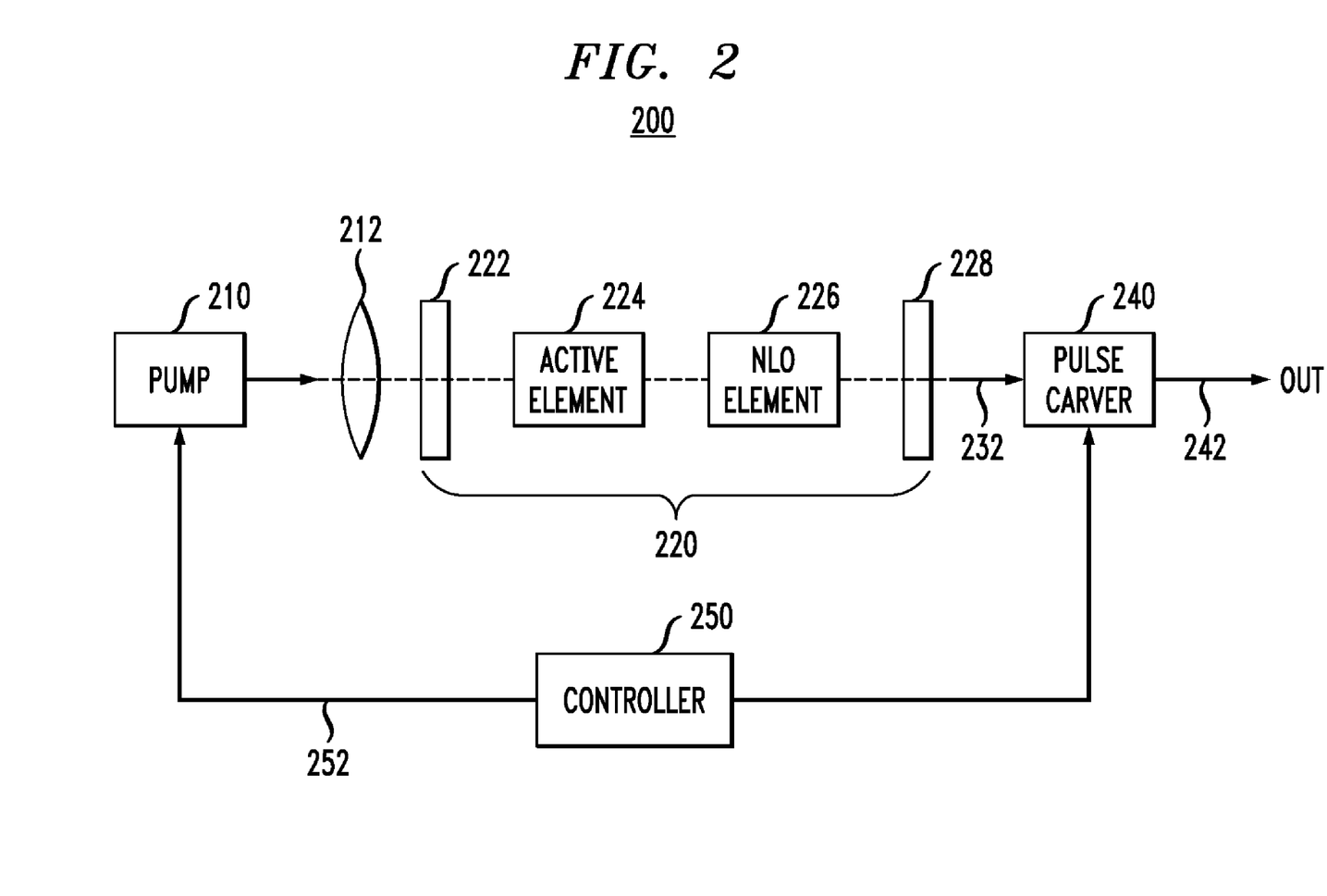
FIG. 2 shows a block diagram of a laser that can be used in the projector of FIG. 1 according to one embodiment of the invention.

FIG. 2 shows a block diagram of a laser 200 that can be used as laser 112 according to one embodiment of the invention. Laser 200 has an optical pump 210 (e.g., a light-emitting diode) that optically pumps, through a coupling lens 212, a laser cavity 220. Laser cavity 220 is defined by a back coupler 222 and a front coupler 228. Back coupler 222 lets the pump light generated by optical pump 210 into laser cavity 220, but serves as a highly reflective mirror for light generated inside the cavity. The light generated inside laser cavity 220 leaks out of the cavity through front coupler 228, which has sufficient reflectivity to cause the photons propagating within the cavity to reverberate between the front coupler and back coupler 222 a relatively large number of times before they can leak out.

Laser cavity 220 further has an active optical element 224 and a nonlinear optical (NLO) element 226. Active optical element 224 absorbs the pump light supplied by optical pump 210 and emits light that forms a relatively wide emission band. NLO element 226 multiplies (e.g., doubles or triples) the frequencies located within a sub-band of the emission band to generate an up-converted emission band. In one embodiment, the sub-band has a spectral width of at least about 10 nm. The wavelengths within the up-converted emission band corresponding to spatial modes of laser cavity 220 become resonantly amplified in the cavity. The amplified light leaks out of laser cavity 220 through front coupler 228 to form an output beam 232.

In various embodiments, output beam 232 can be a CW beam or a pulsed beam having a train of pulses with a pulse-repetition rate, e.g., between about 10 Hz and about 100 MHz. In some embodiments, laser cavity 220 might have a mode-locking element (not explicitly shown in FIG. 2), in which case, laser 200 is a mode-locked laser. If output beam 232 is a CW beam or has a relatively high pulse-repetition rate (e.g., greater than about 100 Hz), then laser 200 might further incorporate an optional pulse carver 240. One purpose of having pulse carver 240 is to temporally gate output beam 232, e.g., to enable light source 110 to generate a train of time-division-multiplexed pulses of three different colors, with pulses of each color appearing at a frame rate (e.g., about 30 Hz) used in projector 100. In an embodiment that generates output beam 232 having a relatively high pulse-repetition rate, each pulse in gated output beam 242 is in fact a burst of shorter pulses originally present in output beam 232. In contrast, in an embodiment in which output beam 232 is a CW beam, each pulse in gated output beam 242 is a continuous pulse having a pulse shape defined by the gating function of pulse carver 240. A controller circuit 250 controls the operation of laser 200, e.g., by controlling optical pump 210 and/or pulse carver 240, in such a manner as to make gated output beam 242 suitable for use in light source 110 (FIG. 1).

In various embodiments, active optical element 224 comprises a glass material doped with one or more rare-earth elements. For example, in one embodiment, active optical element 224 comprises silica glass doped with Nd ions. In another embodiment, active optical element 224 comprises phosphate glass doped with Yb or Er ions. In yet another embodiment, active optical element 224 comprises glass ceramics or aluminate or silica glass doped with Tm ions. In yet another embodiment, active optical element 224 comprises oxide glass doped with Cr ions. One skilled in the art will appreciate that, depending on the desired characteristics of the emission band produced by active optical element 224, different additional glass-material/rare-earth-ion combinations can similarly be used.

NLO element 226 is designed to support second harmonic generation (SHG) or third harmonic generation (THG) over a relatively wide sub-band of the emission band produced by active optical element 224. In a representative embodiment, the spectral width of the sub-band can be about 20 nm. NLO elements suitable for use as NLO element 226 are known in the art (see, e.g., H. Zhu, T. Wang, W. Zheng, et al., "Efficient Second Harmonic Generation of Femtosecond Laser at 1 µm," Optics Express, 2004, v. 12, pp. 2150-2155, which is incorporated herein by reference in their entirety) and are commercially available, e.g., from Del Mar Photonics, Inc. of San Diego, Calif. (product codes BBO-601 through BBO-612).

The following representative embodiments of laser 200 can be used to generate light of different colors. For green light, an embodiment employing (i) active optical element 224 having Nd- or Yb-doped glass with an emission band between about 970 nm and about 1080 nm and (ii) NLO element 226 designed for second harmonic generation can be used. For red light, an embodiment employing (i) active optical element 224 having Tm-doped glass with an emission band between about 1900 nm and about 2000 nm and (ii) NLO element 226 designed for third harmonic generation can be used. For blue light, an embodiment employing (i) active optical element 224 having Cr-doped glass with an emission band between about 1400 nm and about 1500 nm and (ii) NLO element 226 designed for third harmonic generation can be used. In addition, an embodiment employing (i) active optical element 224 having Nd-doped glass with an emission band between about 910 nm and about 950 nm and (ii) NLO element 226 designed for second harmonic generation can be used for generating blue light. One skilled in the art will appreciate that different additional combinations of materials for active optical element 224 and NLO element 226 can also be employed without departing from the scope and principle of the present invention.

Figure 3A:
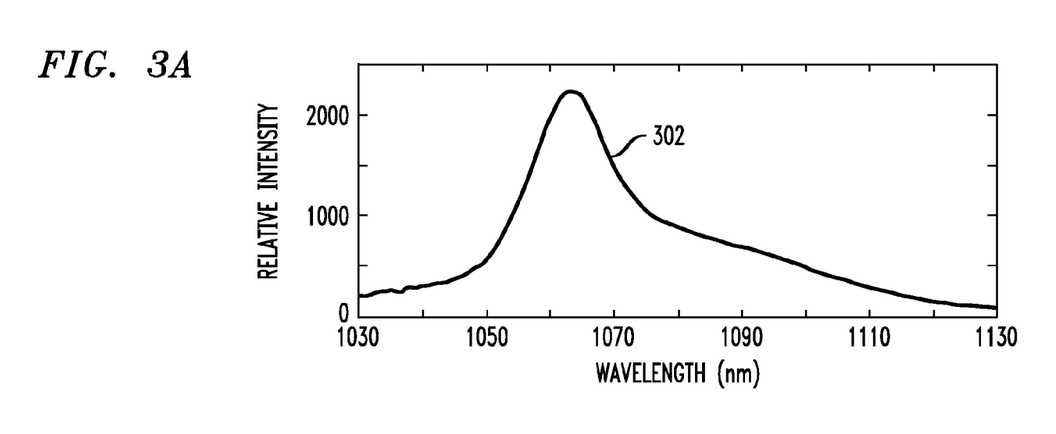
FIGS. 3A-B graphically show representative spectral characteristics of the laser shown in FIG. 2 according to one embodiment of the invention.
Figure 3B:
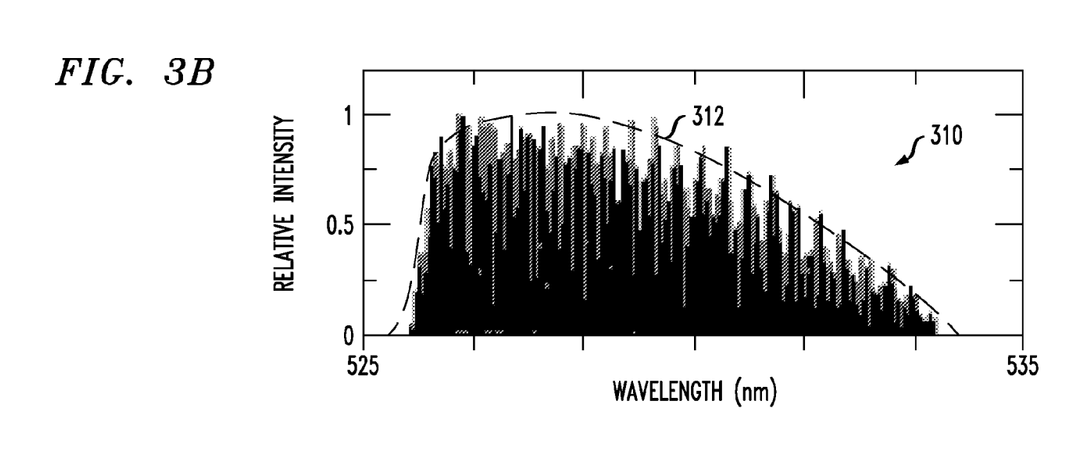

FIGS. 3A-B graphically show representative spectral characteristics of laser 200 according to one embodiment of the invention. More specifically, FIG. 3A graphically shows an emission band of active optical element 224. FIG. 3B graphically shows spectral characteristics of output beam 232. The spectral characteristics shown in FIGS. 3A-B correspond to an embodiment of laser 200 employing (i) Nd-doped glass in active optical element 224 and (ii) partially deuterated KDP (i.e., potassium dihydrogen phosphate) in NLO element 226.

Referring to FIG. 3A, the emission band of Nd-doped glass has a peak 302 whose maximum is located at about 1065 nm. The base of the emission band has a spectral width of about 100 nm and extends from about 1030 nm to about 1130 nm. Peak 302 has a FWHM of about 20 nm.

FIG. 3B shows a representative spectrum 310 of output beam 232 generated by the above-indicated embodiment of laser 200. Spectrum 310 has a spectral envelope 312 characterized by: (i) a spectral-base width of about 8 nm, (ii) a FWHM of about 6 nm, (iii) a maximum located at about 528 nm, and (iv) a median wavelength of about 530 nm. The exact shape of spectral envelope 312 is generally determined by the gain spectrum of NLO element 226 and its SHG phase-matching window. Spectrum 310 further has a plurality of relatively narrow (e.g., about 0.01 nm wide) spectral lines, each corresponding to a different spatial (e.g., Fabry-Perot) mode of laser cavity 220. Spectral separation between the lines of spectrum 310 is generally determined by the length of laser cavity 220 (i.e., the distance between back coupler 222 and front coupler 228). For example, a cavity length of about 1 cm produces a spectral separation between adjacent lines of about 0.025 nm. As a result, spectrum 310 normally has a relatively large number (e.g., more than about 100) of individual spectral lines. Under some operating conditions, the spectral lines of spectrum 310 might not be well resolved due to various line-broadening effects, which might cause (i) different spectral lines to partially overlap and coalesce and/or (ii) spectrum 310 to be relatively free of spikes and/or smooth and continuous. When laser 200 is used in projector 100, the projector projects a multi-colored image on a screen 190 using light that has spectrum 310.

Note that spectrum 310 is a substantially instantaneous spectrum corresponding to an acquisition time of shorter than about 1 microsecond. In other words, spectrum 310 is not obtained by averaging the spectral characteristics of output beam 232 over a relatively long period of time (e.g., longer than about 1 second). One skilled in the art will appreciate that spectrum 310 might change over time, e.g., due to various optical instabilities within laser cavity 220 and/or fluctuations in the optical pump beam supplied by optical pump 210. Moreover, in certain embodiments, controller circuit 250 can use control signal 252 to configure optical pump 210 to change over time one or more characteristics of the pump beam applied to laser cavity 220 so as to actively induce desired temporal changes in the spectrum of output beam 232, e.g., via mode hopping. However, these temporal changes do not significantly change the qualitative appearance of the spectrum from that indicated in FIG. 3B.

Although spectrum 310 corresponds to green light, one skilled in the art will appreciate that other embodiments of laser 200 designed to generate other colors of light will produce output beams 232 having spectral and temporal characteristics that are qualitatively similar to those described above in reference to spectrum 310. More specifically, an embodiment of laser 200 designed to generate red light will generate output beam 232 whose spectrum has (i) a spectral envelope located in the red part of the visible spectrum and (ii) a dynamically changing plurality of spectral lines contained within that spectral envelope, wherein each spectral line corresponds to a different spatial mode of laser cavity 220. Similarly, an embodiment of laser 200 designed to generate blue light will generate output beam 232 whose spectrum has (i) a spectral envelope located in the blue part of the visible spectrum and (ii) a dynamically changing plurality of spectral lines contained within that spectral envelope.

When used in projector 100 as laser 112 (FIG. 1), laser 200 can advantageously reduce the appearance of speckle in the projected image via the above-mentioned wavelength-diversification mechanism. More specifically, different individual spectral lines of output beam 232 effectively produce corresponding independent speckle configurations, which become superimposed on one another in the projected image, thereby causing a corresponding speckle-contrast reduction. Furthermore, the temporal fluctuations in the spectrum of output beam 232 occurring on the time scale faster than the flicker-fusion rate produce additional independent speckle configurations. These additional independent speckle configurations are averaged by the human eye, thereby causing an additional perceived speckle-contrast reduction.

One skilled in the art will appreciate that other types of lasers different from laser 200 can be used in projector 100 in a similar manner, as long as a particular type of laser produces an output beam having suitable spectral and/or temporal characteristics. For example, a relevant spectral characteristic is a relatively large spectral spread (e.g., between about 2 nm and about 20 nm). A relevant temporal characteristic might be a changing spectral content, with the changes occurring on a time scale faster than the flicker fusion rate (e.g., faster than about 30 ms).

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

What is claimed is:

1. An optical device for projecting an image, comprising:
   a first laser comprising a laser cavity and adapted to generate a first light beam; and
   a spatial light modulator (SLM) configured to be illuminated using the first light beam, wherein:
   the SLM is adapted to modulate received illuminating light using a spatial pattern generated by a plurality of pixels to form the image;
   the first light beam has a spectrum comprising a plurality of spectral lines corresponding to a plurality of different spatial modes of said laser cavity; and
   the optical device projects the image using light having said spectrum.

2. The invention of claim 1, wherein the first light beam is characterized by a spectral spread greater than about 2 nm, but is smaller than about 20 nm.

3. The invention of claim 1, wherein the spectrum is characterized by a spectral envelope having a median wavelength corresponding to red, green, or blue color of light.

4. The invention of claim 1, wherein the plurality of spectral lines comprises more than about 100 spectral lines.

5. The invention of claim 1, wherein the first laser further comprises a controller adapted to actively induce mode hopping in the laser cavity to cause temporal changes in the spectrum of the first light beam.

6. The invention of claim 1, wherein:
   the first laser further comprises an optical pump adapted to optically pump the laser cavity;
   the laser cavity comprises an active optical element and a nonlinear optical (NLO) element;
   the active optical element is adapted to absorb light supplied by the optical pump and emit light forming an emission band; and
   the NLO element is adapted to multiply frequencies corresponding to a sub-band of the emission band to cause the first laser to generate the first light beam.

7. The invention of claim 6, wherein the NLO element is adapted to double or triple said frequencies.

8. The invention of claim 6, wherein the sub-band has a spectral width of at least about 10 nm.

9. The invention of claim 6, wherein the active optical element comprises a glass material doped with rare-earth ions.

10. The invention of claim 6, wherein the first laser further comprises a controller circuit adapted to configure the optical pump to actively cause temporal changes in the spectrum of the first light beam.

11. The invention of claim 1, wherein at least some of the spectral lines are broadened, which causes different spectral lines to at least partially overlap and coalesce.

12. The invention of claim 11, wherein the spectrum of the first light beam is a continuous spectrum.

13. The invention of claim 1, further comprising:
   a second laser adapted to generate a second light beam; and
   a third laser adapted to generate a third light beam, wherein:
   the SLM is configured to be illuminated using the second and third light beams;
   the first, second, and third light beams have light of respective different colors to cause said image to be perceived as being multi-colored; and
   at least one of the second and third light beams is characterized by a spectral spread greater than about 2 nm, but is smaller than about 20 nm.

14. The invention of claim 1, wherein the first laser further comprises a pulse carver adapted to temporally gate the first light beam.

15. A method of projecting an image, the method comprising:
   generating with a first laser a first light beam;
   directing the first light beam to illuminate a spatial light modulator (SLM);

modulating illuminating light received by the SLM with a spatial pattern generated by a plurality of pixels to form the image, wherein:
the first laser comprises a laser cavity; and
the first light beam has a spectrum comprising a plurality of spectral lines corresponding to a plurality of different spatial modes of said laser cavity; and
projecting the image using light having said spectrum.

16. The invention of claim 15, wherein:
the plurality of spectral lines comprises more than about 100 spectral lines; and
the method further comprises actively inducing mode hopping in the laser cavity to produce temporal changes in the spectrum.

17. The invention of claim 16, wherein the step of inducing comprises:
optically pumping the laser cavity with pump light; and
changing one or more characteristics of the pump light to induce said mode hopping.

18. A laser, comprising:
a laser cavity; and
an optical pump adapted to optically pump the laser cavity, wherein:
the laser is adapted to generate a light beam characterized by a broadband spectrum; and
the spectrum comprises a plurality of spectral lines corresponding to a plurality of different spatial modes of said laser cavity, wherein the plurality of spectral lines comprises more than about 100 spectral lines.

19. The laser of claim 18, wherein:
the laser cavity comprises an active optical element and a nonlinear optical (NLO) element;
the active optical element is adapted to absorb light supplied by the optical pump and emit light forming an emission band; and
the NLO element is adapted to multiply frequencies corresponding to a sub-band of the emission band to cause the laser to generate the light beam.

20. The laser of claim 19, wherein the sub-band has a spectral width of at least about 10 nm.

21. The laser of claim 18, further comprising a controller circuit adapted to configure the optical pump to actively cause temporal changes in the spectrum of the light beam.

22. The laser of claim 18, wherein at least some of the spectral lines are broadened, which causes different spectral lines to at least partially overlap and coalesce.

23. The laser of claim 18, wherein the light beam is characterized by a spectral spread greater than about 5 nm, but is smaller than about 20 nm.

24. The laser of claim 18, further comprising a controller circuit adapted to actively induce mode hopping in the laser cavity to cause temporal changes in the spectrum of the light beam.

* * * * *